United States Patent
Carsley et al.

(10) Patent No.: US 8,424,961 B2
(45) Date of Patent: Apr. 23, 2013

(54) ALUMINUM ROOF PANEL FOR ATTACHMENT TO SUPPORTING STEEL VEHICLE BODY MEMBERS

(75) Inventors: John E. Carsley, Oakland, MI (US); Chih-Cheng Hsu, Rochester Hills, MI (US); Stewart Edmison, Oshawa (CA)

(73) Assignee: GM Global Technology Operations LLC, Detroit, MI (US)

( * ) Notice: Subject to any disclaimer, the term of this patent is extended or adjusted under 35 U.S.C. 154(b) by 248 days.

(21) Appl. No.: 12/881,418

(22) Filed: Sep. 14, 2010

(65) Prior Publication Data
US 2012/0061998 A1 Mar. 15, 2012

(51) Int. Cl.
B62D 25/06 (2006.01)

(52) U.S. Cl.
USPC .......... 296/210; 296/193.12; 296/203.03; 296/29

(58) Field of Classification Search ........... 296/187.13, 296/193.12, 203.03, 29, 30, 210
See application file for complete search history.

(56) References Cited

U.S. PATENT DOCUMENTS

| | | | |
|---|---|---|---|
| 5,681,076 A * | 10/1997 | Yoshii | 296/210 |
| 5,735,569 A * | 4/1998 | Takagi et al. | 296/210 |
| 5,829,825 A * | 11/1998 | Kim | 296/210 |
| 6,126,232 A * | 10/2000 | Nakano | 296/210 |
| 6,945,592 B1 * | 9/2005 | Hui et al. | 296/187.01 |
| 7,055,882 B2 * | 6/2006 | Santaolalla Gil et al. | 296/37.7 |
| 7,080,876 B2 * | 7/2006 | Ido et al. | 296/210 |
| 7,083,221 B2 * | 8/2006 | Hida | 296/146.8 |
| 7,182,381 B2 * | 2/2007 | Ogawa et al. | 296/29 |
| 7,407,224 B2 * | 8/2008 | Okabe et al. | 296/210 |
| 7,810,871 B2 * | 10/2010 | Matsui | 296/187.12 |
| 7,883,142 B2 * | 2/2011 | Hosaka et al. | 296/210 |
| 7,900,997 B2 * | 3/2011 | Hosaka et al. | 296/193.12 |
| 7,997,643 B2 * | 8/2011 | Shah et al. | 296/210 |
| 8,123,286 B2 * | 2/2012 | Furusako et al. | 296/203.03 |
| 2005/0116509 A1 * | 6/2005 | Ido et al. | 296/210 |
| 2008/0122259 A1 * | 5/2008 | Matsui | 296/187.12 |
| 2010/0140982 A1 * | 6/2010 | Hosaka et al. | 296/210 |

FOREIGN PATENT DOCUMENTS

| | | | |
|---|---|---|---|
| JP | 2007-83830 | * | 4/2007 |
| JP | 2008-222013 | * | 9/2008 |

OTHER PUBLICATIONS

Matsumura, Yoshinobu et al.; Weight Reduction Technology for Improved Handling Performance of Lancer Evolution; Mitsubishi Motors Technical Review; 2004; No. 16; pp. 79-84.
Matsumura, Yoshinobu et al.; Development of Application Technology of Aluminum Roof; Mitsubishi Motors Technical Review; 2006; No. 18; pp. 68-74.

* cited by examiner

*Primary Examiner* — Glenn Dayoan
*Assistant Examiner* — Gregory Blankenship
(74) *Attorney, Agent, or Firm* — Reising Ethington P.C.

(57) ABSTRACT

The substitution of aluminum alloy roof panels for the low carbon steel roof panels most commonly used in motor vehicles is an attractive option for vehicle mass reduction. Often, however, the remainder of the vehicle body structure continues to be fabricated of steel. The combination of the aluminum alloy roof attached to the steel body may create compressive stresses in the aluminum roof when the body is subjected to elevated temperatures such as those required to cure or bake the paint applied to the body. These stresses may lead to unacceptable appearance features in the visible segment of the roof. By modifying the roof stamping to introduce a tabbed flange for attachment to the body and/or modifying the generally-vertical wall joining the flange to the roof interior, the stresses may be minimized and relocated to segments of the roof not normally visible.

20 Claims, 6 Drawing Sheets

ALUMINUM ROOF PANEL FOR ATTACHMENT TO SUPPORTING STEEL VEHICLE BODY MEMBERS

TECHNICAL FIELD

This invention pertains to the design and shaping of aluminum vehicle roof panels for attachment to supporting steel vehicle body members. More specifically, this invention pertains to the design of such aluminum roof panels to minimize thermal distortion of the roof panels when, for example, a vehicle body is to be repeatedly painted and passed through paint ovens.

BACKGROUND OF THE INVENTION

The body structure of modern vehicles is developed by assembling and permanently attaching a plurality of generally stamped parts. In one body construction, variously described as unibody, monocoque, or body-frame-integral (BFI), these stamped parts may cooperate in conveying to the vehicle the desired structural rigidity and strength. Alternatively, the body may be mounted to a separate frame structure.

In many instances the stamped body parts will be assembled from an outer body panel, visible to an outside observer and conveying an aesthetically-pleasing appearance and an inner panel, frequently hidden from view by subsequent attachment of plastic or fabric trim. The combination of inner and outer panels positioned and held in spaced apart configuration, creates an efficient structural entity. When additional strength is required the inner and outer panels may be supplemented with a third body stamping, a reinforcement often employed in selected locations only, to provide selective structural enhancement. Two major components of the vehicle body structure are the body side members. These body structures substantially span the length of the passenger compartment and include openings for doors.

The body side structure typically extends above the door window openings and includes a rail, formed as a closed box structure supported on a plurality of pillar or post-like elements which define and bound the door openings. The rail structure may include a flange, suited both for ease of permanently attaching the body inner, outer and reinforcement panels as well as providing a mounting surface for the vehicle roof. The mounting flange is frequently positioned below the top of the body side and interior to the body outer panel so that it is at least partially concealed from anyone observing the outside of the vehicle.

It will be appreciated that vehicles may be viewed as comprising a passenger compartment, and engine compartment and a luggage compartment, which may, in minivans, station wagons and the like, form a part of the passenger compartment.

The body sides are joined to the floor pan to close out the bottom of the passenger compartment and, in the front, to a firewall, a stamped panel which extends the width of the vehicle and separates the passenger compartment from the engine compartment. The rear of the passenger compartment may be terminated and separated from the vehicle trunk in a sedan or coupe by a stamped panel extending the width of the vehicle or by a liftgate in vehicles such as hatchbacks, SUVs or minivans.

The passenger compartment is fully closed out by addition of a roof. Typically a roof resembles an inverted shallow pan, with generally vertical walls and typically curved in at least one direction. The walls of the shallow pan terminate in a generally horizontal flange of substantially-uniform width, extending around the periphery of the roof and shaped to generally conform to the flanges of the body sides. The roof flanges will therefore be supported by the mounting flanges formed in the body sides and may be attached to the body sides at these flanges. The roof will also be attached to and supported by roof headers and bows, closed-section or channel-shaped structures secured to the body sides and extending across the width of the vehicle. These roof headers and bows may also be shaped to cooperatively interact with the pillar structure of the body sides to accept and retain the windshield and rear glass.

Vehicle roofs are commonly fabricated as a stamped sheet metal outer panel, attached to the vehicle body on all sides or to the reinforcing rib or channel structures comprising the roof headers/bows. An inner panel is not normally employed and an attractive interior appearance is provided by installation of a fabric-covered and insulated headliner. If a steel roof is to be attached to a steel body, a series of resistance spot welds is typically used to attach roof and body.

More recently, with interest in reducing vehicle mass, consideration has been given to employing aluminum alloy stampings for vehicle roofs. Because steel and aluminum may not be spot welded together, the aluminum alloy roof is alternatively attached to the steel body using rivets, usually supplemented by adhesive. This approach, though appealing from a vehicle mass-reduction viewpoint, raises issues due to the significantly different coefficients of thermal expansion of aluminum and steel—about $23 \times 10^{-6}$ $K^{-1}$ for aluminum and about $11 \times 10^{-6}$ $K^{-1}$ for steel.

Because the steel and aluminum are permanently joined together by the rivets, this difference in thermal expansion of steel and aluminum will develop stresses in the aluminum and steel whenever the vehicle body temperature differs from the temperature at which the joint was made. The highest temperature experienced by the vehicle body is during manufacture, when the assembled body is painted. Automotive paint consists of a number of layers, applied separately and then cured at elevated temperature. The paint is cured by passing the painted body through one or more paint bake ovens to raise the body temperature to about 180-200° C. and maintain it at that temperature for at least 20 minutes. This temperature excursion may be sufficient to initiate plastic deformation in the aluminum roof. Since plastic deformation is not reversed on cooling, any such deformation may result in an appearance feature such as a crease or buckle in the roof which would be unacceptable to the customer.

There is therefore a need for an improved roof design better suited to resist plastic deformation and the resulting permanent deformation of an aluminum alloy roof attached to a steel body structure during temperature excursions such as those typical of paint bake cycles.

SUMMARY OF THE INVENTION

A stamped, sheet metal, vehicle body roof commonly comprises an extensive, gently-curved interior portion overlying the passenger compartment, bounded by one or more short and downwardly-sloping, walls terminating in a generally horizontal flange of substantially-uniform width. The flange is intended for attachment of the roof to the vehicle body and is shaped and contoured to conform to the body mounting surfaces formed into the vehicle body side structure along the vehicle length.

If an aluminum roof stamping is to be attached to a predominantly steel vehicle body, a suitable joining practice is to use rivets, usually self-piercing rivets, applied through the roof flange and engaging the steel mounting surfaces below, to secure the roof flange to the body mounting surfaces. The rivets are often supplemented by adhesive applied to the faying surfaces of the roof flange and the body mounting surfaces. Sufficient adhesive is applied to effect bonding across the entire flange width to maximize the strength of the adhesive bond.

When a fully-assembled vehicle body is painted, it passes at least once through a paint bake oven where it reaches temperatures of 180-200° C. for times in excess of 20 minutes. In bodies fabricated predominantly of steel but with an aluminum alloy roof, the high temperature environment of the paint bake oven will induce compressive stresses in the aluminum alloy roof due to the approximately 2:1 ratio of thermal expansion coefficients for steel and aluminum alloys.

Structures loaded in compression along a loading direction or load axis may deform inhomogeneously. Inhomogeneous deformation, often described as buckling, will typically occur in a local region of the structure as it is displaced out of alignment with the load axis. Such buckling may be elastic, in which case the structure will return to its initial form when the load is released, or plastic, in which case the buckle will persist even after removal of the load.

Typically the buckling will initiate along the attachment flanges, in the vicinity of the rivet locations. This flange buckle may propagate to roof wall and extend inward to the interior of the stamping to form a wave, buckle or other appearance irregularity on the portion of the roof which is visible to an observer.

Two modifications to the roof geometry are proposed to reduce or suppress any tendency for a roof buckle. In a first modification, portions of the roof flange located between rivet locations are cut away to reduce their width and create a tabbed flange consisting of a narrow flange from which project a plurality of spaced-apart tabs. The tabs, which are located at the rivet locations, may be shaped as regular trapezoids in plan view but other shapes may be employed. The spacing between tabs is determined by the rivet locations and may be uniform or non-uniform responsive to the rivet placement practice for specific vehicles.

In a second modification, the design of the downwardly-sloping walls joining the roof flange to the roof section of the stamping is modified to introduce at least a step or a jog into the wall, thereby creating a wall comprising at least two, stepped-apart, downwardly-sloping segments connected by at least one short generally horizontal segment. That is the downwardly-sloping wall is partitioned into at least two segments, one positioned above each step and a second segment positioned below each step. When more than one step is employed a segment may be identified as positioned below a first step, or, equivalently, positioned above a second step. The lengths of the segments may differ, due for example to packaging and vehicle styling requirements but it is preferred that the lengths of the segments be of substantially equal length.

The segments may all be angled inwardly toward the vehicle centerline or all be angled outwardly away from the vehicle centerline. Configurations in which one or more segments are outwardly inclined and one or more segments is/are inwardly-inclined are also contemplated. In general, the lengths and inclinations of the segments and of the generally horizontal step(s) may be selected to achieve the required degree of buckle resistance while satisfying any packaging and/or styling constraints.

It is intended that both these modifications to the stamped roof design be applied in conjunction so that they may operate cooperatively to reduce or eliminate distortion in aluminum roofs attached to steel vehicle bodies.

Other objects and advantages of the invention will be apparent from a description of preferred embodiments which follows in this specification.

BRIEF DESCRIPTION OF THE DRAWINGS

FIG. 10A shows the resultant stresses for a design with a continuous flange and a single downwardly-sloping wall such as is shown in FIG. 5: FIG. 10B shows the resultant stresses for a roof with tabbed flange and a downwardly-sloping wall incorporating a generally-horizontal step to divide the wall into two segments such as is shown in FIG. 9.

DESCRIPTION OF PREFERRED EMBODIMENTS

Increasingly, low-carbon steel, long the material of choice for vehicle body construction, is being displaced by higher strength-to-weight ratio materials such as high strength steels, aluminum alloys and magnesium alloys. This trend is driven by a desire to use materials most effectively, primarily with a goal of reducing vehicle weight for improved fuel economy, and is enabled by the fact that vehicle bodies are permanently-attached assemblages of individual, usually stamped sheet metal, components. Thus, selective material substitution may be achieved on a component by component basis and it is not unusual for attached, abutting components to be formed of different materials. An example of this is the application of an aluminum alloy roof sheet metal panel to a steel, or largely steel, body structure and schematically illustrated in FIG. 1 which shows an aluminum roof stamping 12, positioned on a steel vehicle body structure 10 (shown in ghost) representative of the open interior structure of the body, and large roof panel, of a Sport Utility Vehicle (SUV).

Figure 2:
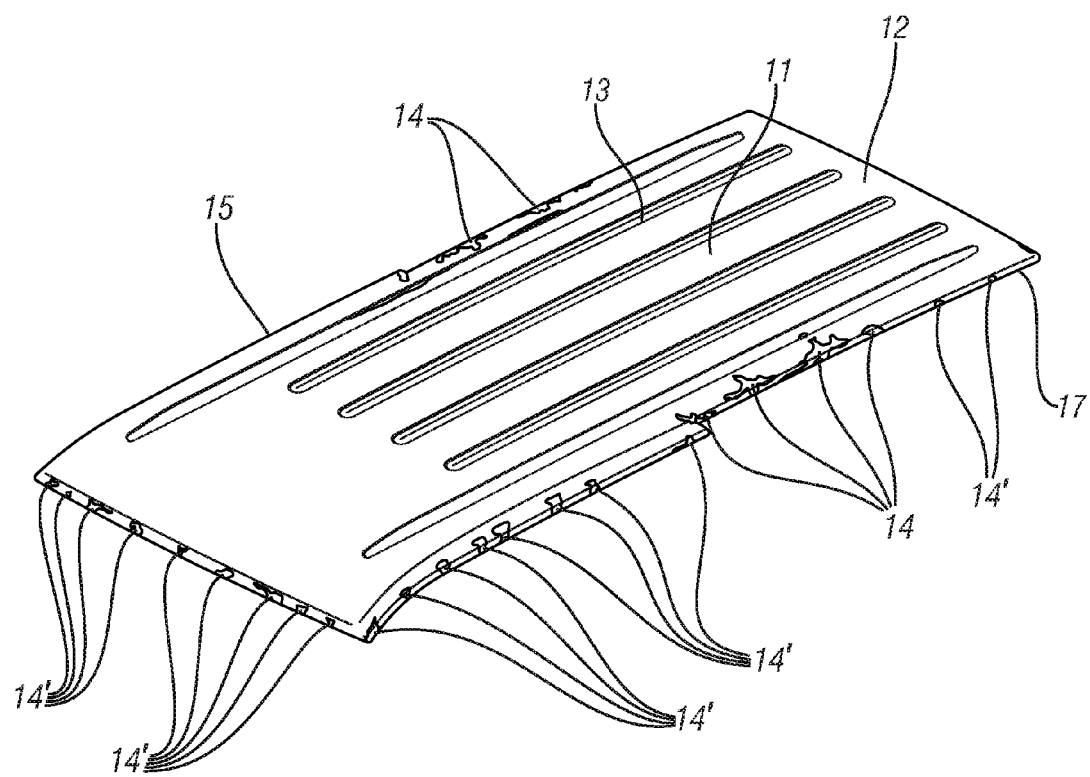
FIG. 2 is a perspective view of the aluminum alloy roof panel of FIG. 1 showing stress contours resulting from exposure of the aluminum alloy roof-steel body vehicle body of FIG. 1 after being subjected to the paint bake process.

Roof stamping 12, shown in more detail in FIG. 2, consists of a central portion 11 which overlies the passenger compartment and which may, as depicted, incorporate stiffening ribs 13, formed in the stamping die, and intended for accommodating loads imparted by articles transported on the vehicle roof, for example in a luggage rack. These ribs are commonly used on vehicle such as SUVs or vans because the roof panels for these vehicles are extensive and generally flat. The ribs stiffen the panel and help it to maintain its shape. For roofs with more curvature, such as those in smaller sedans, these ribs are not required.

Roof stamping 12 is generally rectangular in plan view but because individual roofs are required to conform to vehicle styling, they may exhibit minor deviations. As an example, note the 'jogs' 112 in the roof 12 marking the transition from the door opening section to the closed section of the SUV body 10 shown in FIG. 1. Roof stamping 12 will generally exhibit curvature in at least one direction, from the front of the vehicle to the rear, and, more commonly, is doubly-curved, with side-to-side curvature also. The roof stamping generally resembles an inverted, rectangular shallow pan with, at least on edges 15 and 17, downwardly-sloping walls 19 terminated by generally-horizontal flanges 21, best seen in section 3-3 at FIG. 3.

Figure 3:
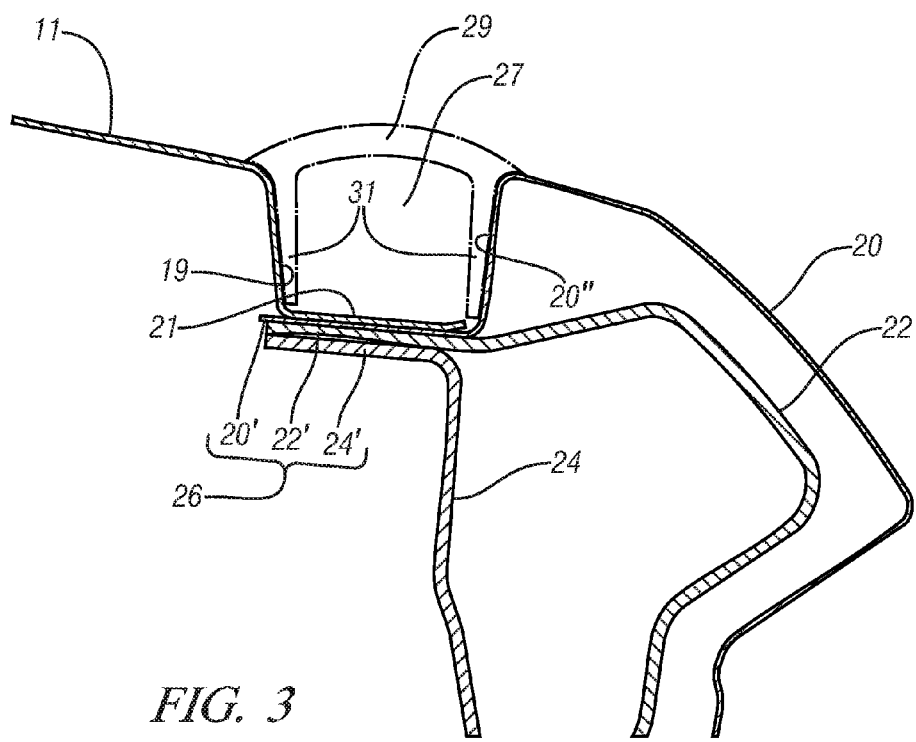
FIG. 3 is a typical cross-section, taken at location 1-1 of FIG. 1, of an edge portion of a vehicle roof and the body structure to which it is attached to show the components of the roof and body structure.

FIG. 3 also shows some details of the body structure to which the roof attaches. The body side structure typically consists of an outer panel 20, an inner panel 24, and interposed between them a reinforcement 22. The strength of any structure depends on both the material strength and the material thickness so that there is great flexibility in the choice of materials and gages, but the body structure may be representative of a 0.7-0.9 millimeter low strength steel outer panel 20, a higher strength inner panel 24, generally 1.2 millimeters or greater in thickness, and a reinforcement 22.

Generally-horizontal flange segments 20', 22' and 24' have complementary forms which nest and are then welded together, typically using a plurality of spot-welds, to form mounting flange 26. Roof flange 21, in turn, has a shape complementary to mounting flange 26 and nests with mounting flange 26. Aluminum alloys are not readily welded to steel and, alternatively, roof stamping 12 is attached to steel body 10 by a plurality of spaced apart mechanical fasteners, usually rivets, which secure roof flange 21 to mounting flange 26. Adhesive may placed between the upper surface of flange segment 20' and the underside of roof flange 21, that is the faying surfaces of the roof and mounting flanges, to further enhance joint strength. Most preferably Self Piercing Rivets (SPR) are employed since SPR do not fully penetrate mounting flange 26 and therefore minimize any need for supplementary sealing to avoid ingress of water or air into the vehicle interior at rivet locations. A suitable SPR may have a diameter between 3 and 5 mm with length, material and geometry tailored to the specific material stackup, or layers of sheet metal, and material combinations to be joined.

Figure 4:
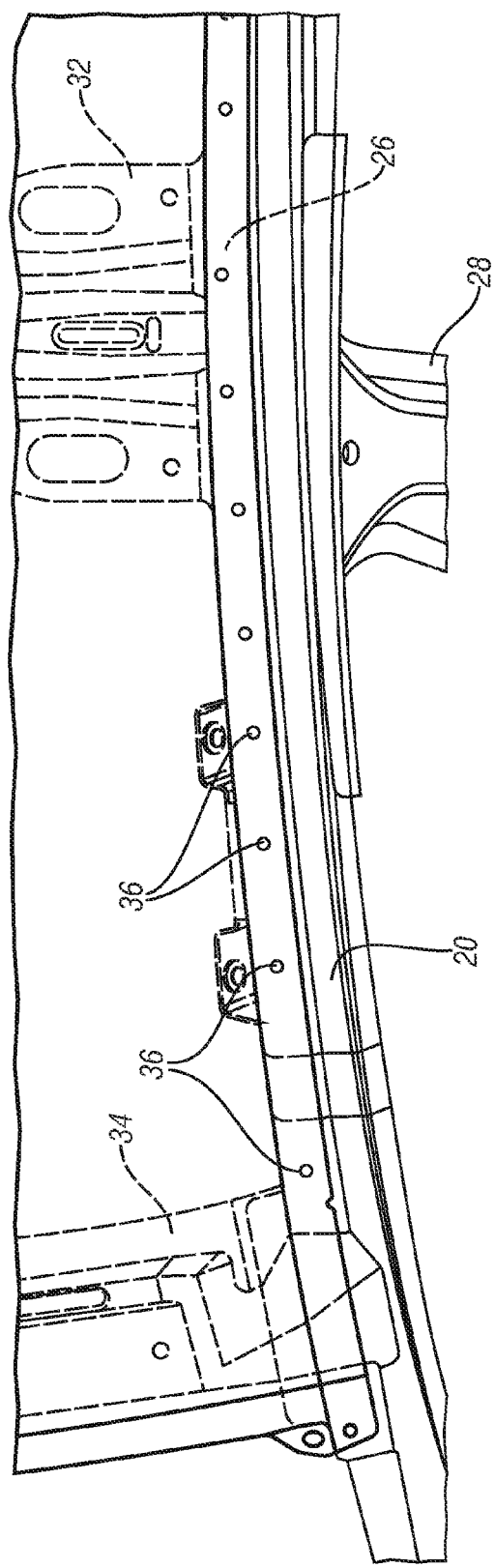
FIG. 4 is a perspective view of a portion of a vehicle roof assembly illustrating a typical rivet placement.

A schematic perspective view of a representative riveted roof of conventional design is shown in FIG. 4 which illustrates typical rivet 36 placement, about 2-6 inches apart, as well as B-Pillar 28 (also shown on FIG. 1) and roof bows 34 and 32, also attached to mounting flange 26, and extending across the vehicle to provide additional roof support. It may be noted in FIG. 4 that the rivets may not be regularly spaced.

Rivet positioning is generally dictated by the need for the strength of the attachment between the roof and body and more, closely-spaced, rivets will promote stronger attachment. However, metal stackup, or the number of layers of sheet metal in the joint, must also be considered. Too many sheet metal layers may interfere with the riveting process and result in some modification of rivet placement.

Roof distortion is minimized when fewer rivets are employed. Thus, the use of more rivets than those required for the required roof-body attachment strength is not only ineffective, but, in fact, detrimental to, minimizing roof distortion.

By consideration of FIGS. 3 and 4 it will be obvious that the rivets will be located at the bottom of the channel, generally indicated as 27 (FIG. 3) formed by roof wall 19, roof flange 21 and a portion 20" of outer body panel 20 to enable joining roof flange 21 to mounting flange 26. The rivets are, therefore, at least partially obscured from customer view. It is generally desired to further limit observation of the rivet by covering channel 27 with, for example, sealing strip 29 positioned in channel 27. Strip 29 may be retained in any convenient manner. In the example shown, strip 29 has a cross-section generally resembling the greek letter pi (Π) with leg portions 31 configured for suitable attachment within channel 27. As shown, leg portions 31 frictionally engage channel walls 19 and 21" but this configuration is illustrative and not limiting.

Although body material selection is primarily driven by mechanical characteristics, such as strength and elastic modulus (stiffness), the different material classes, ferrous and non-ferrous, exhibit markedly different coefficients of thermal expansion. Most steels for automotive applications have values of thermal expansion coefficients ranging from about $11 \times 10^{-6} K^{-1}$ to about $13 \times 10^{-6} K^{-1}$ while aluminum and magnesium have values ranging from about $23 \times 10^{-6} K^{-1}$ to about $25 \times 10^{-6} K^{-1}$, respectively.

It is well known that rigidly attaching two materials with dissimilar coefficients of thermal expansion will generate thermal stresses when the temperature is raised or lowered. On heating, tensile stresses develop in the lower coefficient of thermal expansion material and compressive stresses develop in the material with the higher coefficient of thermal expansion. Thus, an aluminum roof attached to a steel body, will be subjected to compressive thermal stresses with increase in temperature, the thermal stresses increasing generally in proportion to the temperature.

After assembly, but before attachment of closures such as doors or hoods, vehicle bodies, commonly described as Bodies-in-White, are washed and then painted. The paint must be cured by exposure to elevated temperatures, requiring that the bodies-in-white pass through at least one paint bake oven, subjecting the bodies to temperatures of up to 200° C., more typically about 180° C., for a period of not less than 20 minutes. This temperature is appreciably greater than any temperature experienced by the vehicle in service and establishes the greatest compressive stress developed in the aluminum roof.

Structures, such as the aluminum roof, when subjected to compressive loads or stresses may deform inhomogeneously and bend locally, forming a buckle, analogous to the Euler buckling developed in slender, end-loaded columns. If the buckling stress exceeds the yield stress of the metal, the buckle will be permanent and the structure will not adopt its original configuration even after removal of the compressive loads, or, in the case of the vehicle body subjected to a paint baking operation, even after the vehicle body exits the oven and cools.

Figure 1:
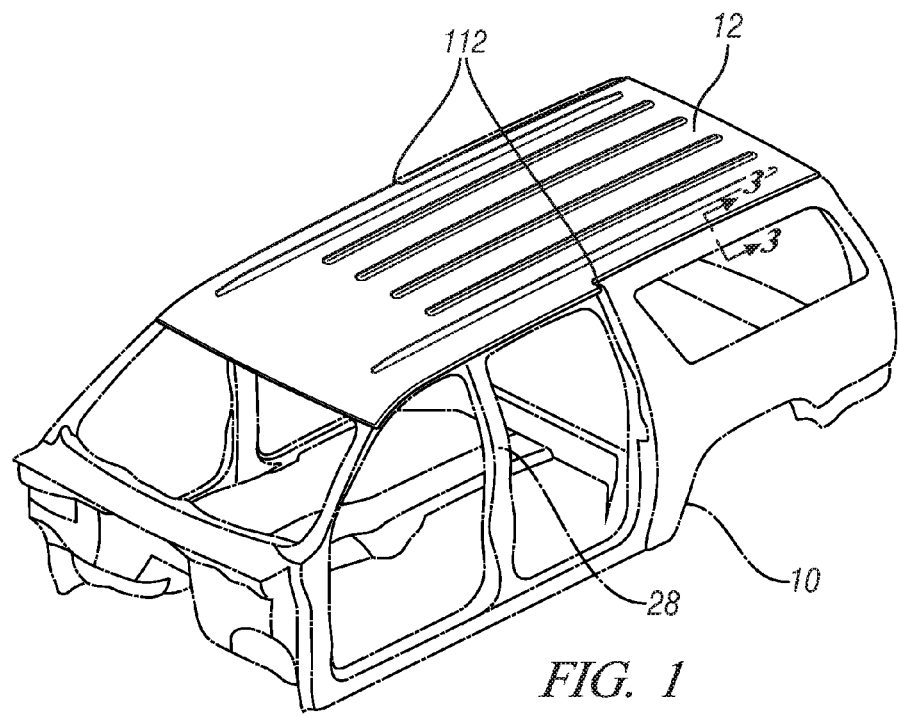
FIG. 1 is a perspective view of an automobile steel body structure with an attached aluminum alloy roof panel, identifying section 3-3 shown in FIG. 3.

FIG. 2 illustrates computed regions of high stress, obtained by modeling, using finite element procedures, exposure of the conventional roof and body structure indicated in FIG. 1 to a temperature of 180° C., representative of paint bake oven practice. These results will be described in greater detail later but show that in many locations 14' the stresses are largely confined to the downwardly-sloping wall and flange regions of the roof and do not appreciably extend into the visible roof surface 11 or the stiffening ribs 13. In other regions 14 of the roof, however, the stresses are more spatially extensive and extend into both the visible regions of the roof 11. It may be noted that the stresses extend into the stiffening ribs 13 indicating the stiffening ribs do little to moderate the stresses.

Figure 5:
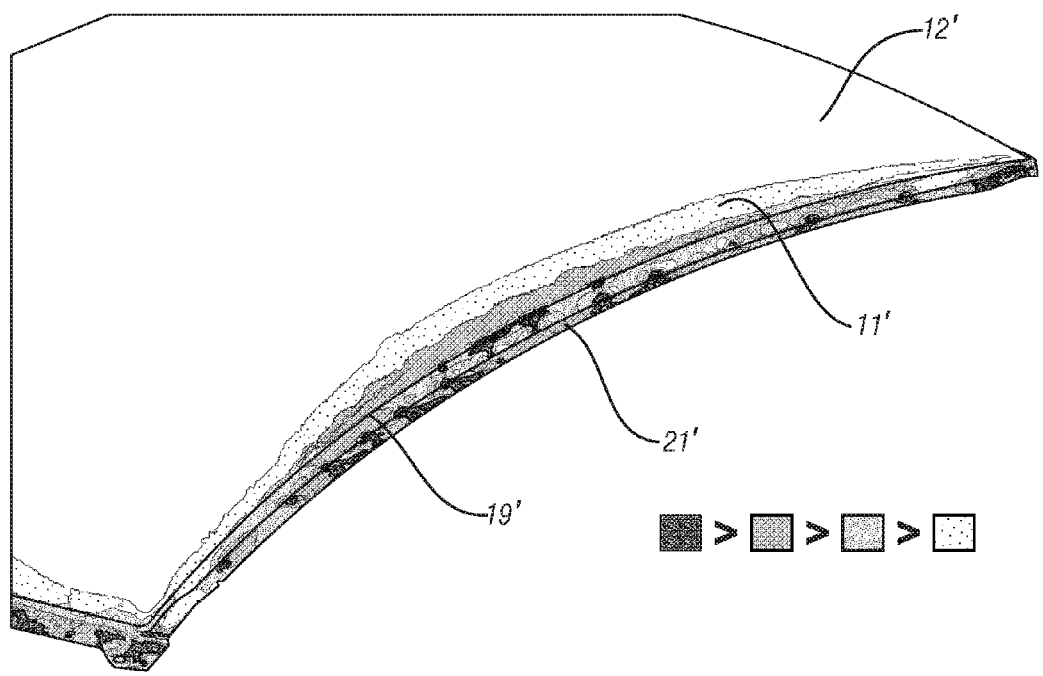
FIG. 5 shows a schematic perspective representation of a contour plot indicative of the stress distribution of a second aluminum alloy roof panel during a paint bake cycle.

FIG. 5 shows local stress contours arising in an aluminum alloy roof 12' of a second, conventional-design roof after attachment to a steel body and exposure to a paint bake thermal cycle with temperatures of 180° C. The relative values of the stresses are indicated by the density of the stippling, with the greatest stresses represented by the densest stippling and the least stress indicated by the least dense stippling as indicated in the Figure. Regions with no stippling were substantially stress-free. As in the example shown in FIG. 2, the stresses are greatest in the flange area 21' but propagate, through wall section 19', into the visible portion of the roof 11'. In this example, where the roof has some concave-down front to rear curvature the strains are more concentrated in the regions of greatest curvature.

Figure 6:
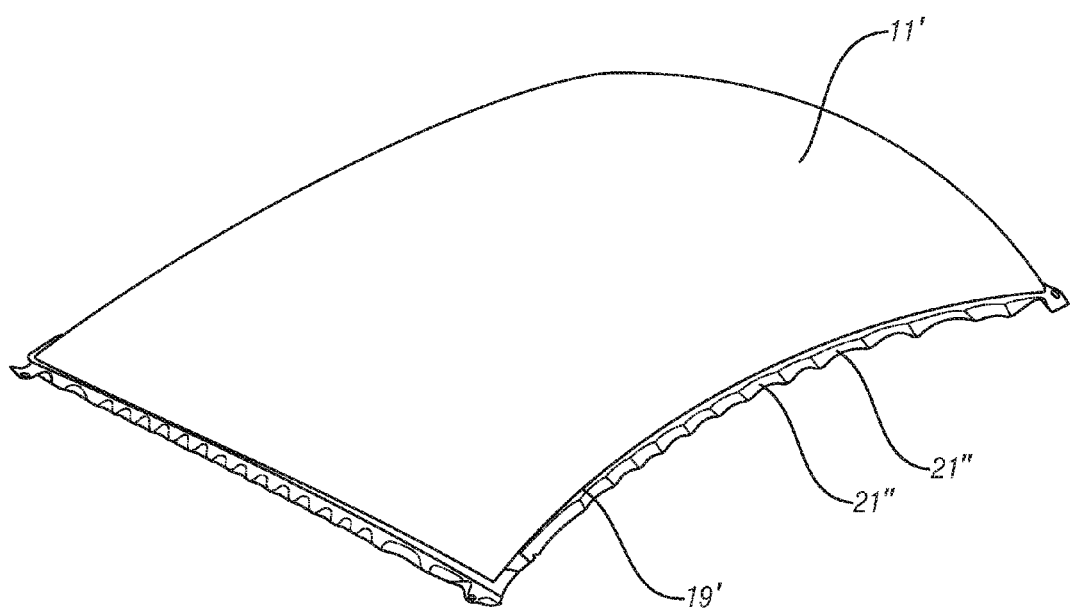
FIG. 6 shows a schematic perspective representation of the displacements occurring during a paint bake cycle in the roof flange of the second aluminum alloy roof design. The vertical displacements have been exaggerated for clarity.

Details of how the stress concentration modifies the roof geometry are shown in FIG. 6. While the details of the distortion on the visible roof surface are not readily discerned, it is clear that the unsupported segments of roof flange 21' (FIG. 5), corresponding to the gaps between rivets (not shown) have buckled upward to form flange segments 21" of more extreme concave-down curvature. The upward displacement of the roof flange represented by segments 21", may in turn be transmitted through wall section 19' to create visible distortion (not shown) in roof panel 11'.

Figure 7:
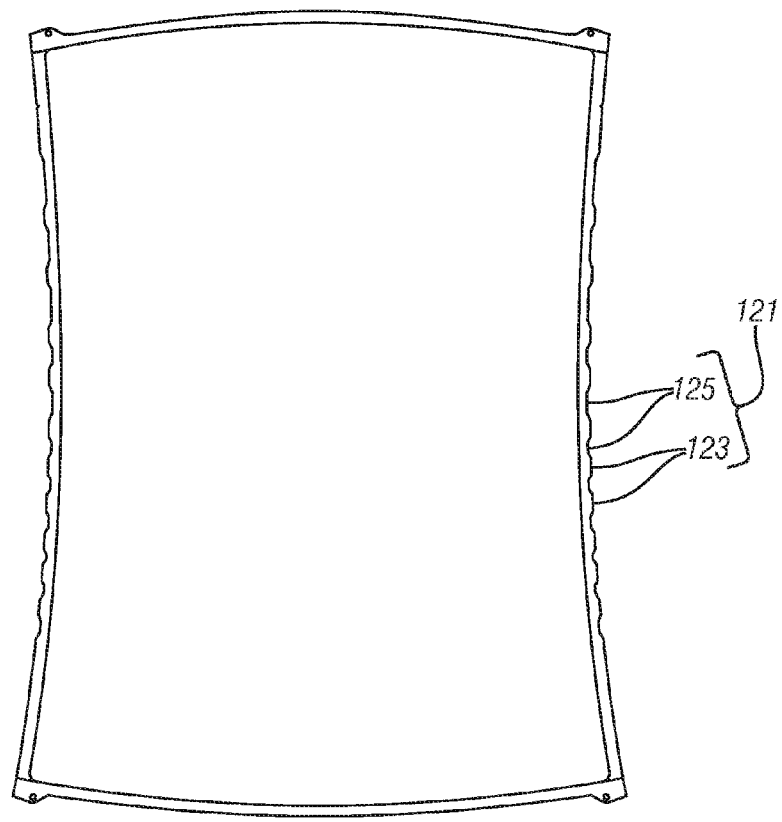
FIG. 7 shows, in plan view, an aluminum roof design, the interior roof section of which is generally similar to that shown in FIG. 6, to show the tabbed appearance of the roof flanges.

The severity and extent of the distortion may be reduced by making two modifications to the geometry of roof stamping 12'. The first modification is to modify roof flange 21 (FIG. 3) by creating a tabbed roof flange 121 as shown in plan view in FIG. 7. Here tabbed roof flange 121 has tabs 123 at the rivet placement locations. The flange width is defined by the regions 125 between the tabs. The width of the tabs 123 is measured from the edge of the flange at region 125, to the extremity of the tab. Thus the maximum extent of the tabbed roof flange is the sum of the flange width and the tab width. In FIG. 7, tabs, and their associated flange are shown on only the sides of the roof and not on the front (at the windshield) or rear (rear glass) sections of the roof. This reflects the observation that the distortion is more likely to occur along the edges of the roof. However the tabbed flange geometry is equally suited to use on the front or rear of the roof if needed.

The tabs are generally sized and positioned to accommodate the rivets for attaching the roof panel to the vehicle body. It will be appreciated that the combined width of the flange and tab will substantially equal the width of a conventional flange. This limits the tab width for two reasons: first, it is preferred that the flange width not extend beyond the centerline of the rivets in the adjacent tabs; and second, an insufficient overlap of the faying surfaces may compromise performance of the adhesive bond. With due regard for these considerations, it is preferred that the tab width range from between 25% to 100% of the flange width and, more preferably, that the width of the tab be about 66% of the flange width.

In a second modification intended for cooperative interaction with the tabbed flange 121, the severity and extent of the distortion may be reduced by introducing at least a step or jog in wall 19 to create a wall feature with at least two segments such as the exemplary embodiments shown in cross-section in FIGS. 8A-D.

Figure 8A:
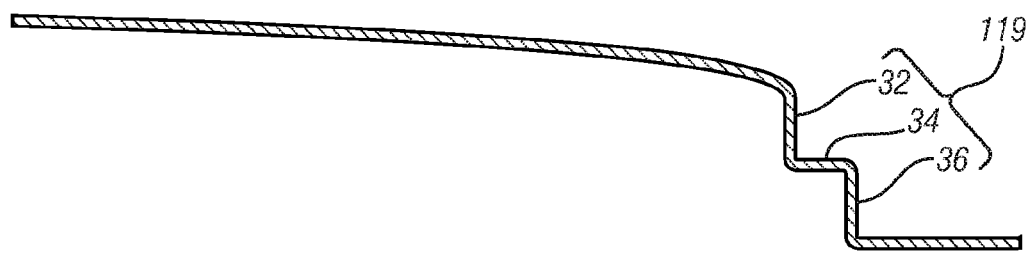
FIGS. 8A-D show, in cross-section, representative downwardly-sloping wall designs for a roof, for reduction in stress concentration.
Figure 8B:
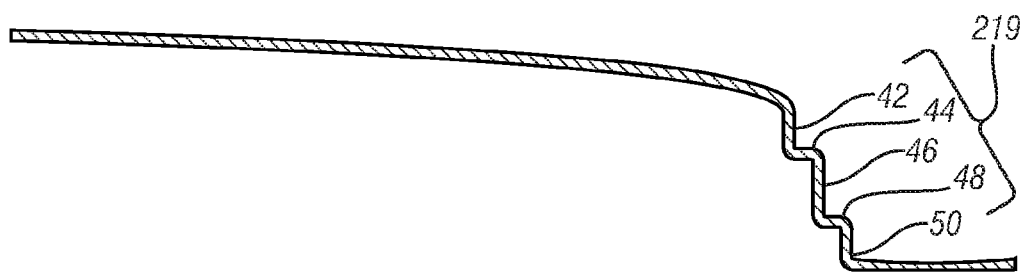
Figure 8C:
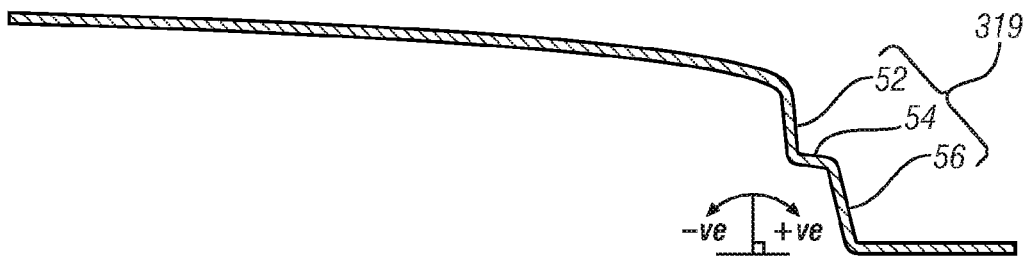
Figure 8D:
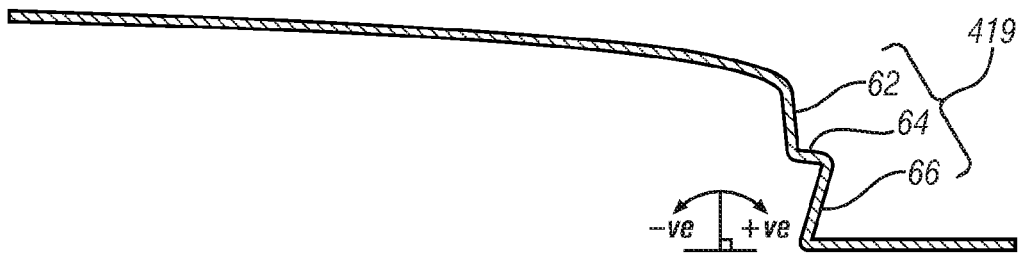

In FIG. 8A the wall section 119 comprises two vertical wall segments 32 and 36 joined by horizontal segment 34. In FIG. 8B, wall section 219 comprises three vertical wall segments 42, 46, and 50 joined by two horizontal segments 44 and 48. In FIGS. 8C and 8D the wall segments are inclined from the vertical. As indicated by the inset on each of FIGS. 8C and 8D, a clockwise deviation from vertical is denoted as positive and a counterclockwise deviation from vertical is denoted as negative. In FIG. 8C negatively-inclined, generally vertical segments 52 and 56 are joined by inclined, generally horizontal segment 54 to form wall 319. In FIG. 8D negatively-inclined segment 62 is connected to inclined generally horizontal segment 64 which, in turn is connected to positively-inclined segment 66 to form wall 419.

Alternatively, the inclinations of segments 52, 56, 62 and 66 may be related to the vehicle centerline and described as outwardly-extending, segments 52, 56 and 62 for example, or inwardly-extending, segment 66 for example.

In a preferred embodiment the wall section will comprise two segments, for example combination 32 and 36, or combination 52 and 56, or combination 62 and 66, of approximately equal length.

Those skilled in the art will appreciate that not all configurations shown or other configurations, derivative of those shown and readily comprehended by skilled artisans, may be manufactured with equal ease. For example the negatively inclined, or inwardly-inclined, segment 66 shown in FIG. 8D could result in a die lock condition during forming and necessitate the use of more complex cam dies.

The specific configurations shown in FIGS. 8A-D are exemplary and not limiting, and derivative configurations which may differ from those shown are fully comprehended in the scope of the invention. These differences may include, without limitation, any or all of such characteristics as: the lengths or orientations of individual segments; the radius of the arc segments which transition between the generally-vertical and generally-horizontal segments; and the angular orientation of the generally-vertical and generally-horizontal segments.

Figure 9:
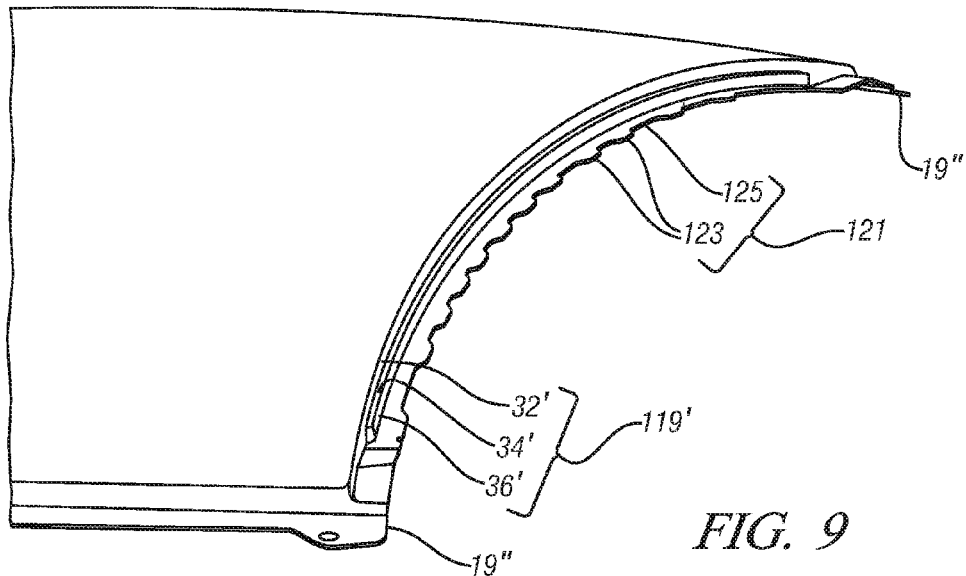
FIG. 9 is a perspective representation of a roof incorporating both a tabbed flange and a wall section incorporating a generally-horizontal step.

FIG. 9 shows, in perspective view, a representation of an aluminum alloy roof incorporating both modifications—tabbed flange 121, comprising tabs 123 and reduced width flange 125, and a stepped wall section 119', comprising generally-vertical segments 32' and 36' joined by generally-horizontal segment 34'. The stepped wall section may extend along the entire side length of the roof, or may, as shown in FIG. 9, terminate some distance from the front or rear of the roof and smoothly blend into the conventional single wall configuration shown at 19".

Figure 10A:
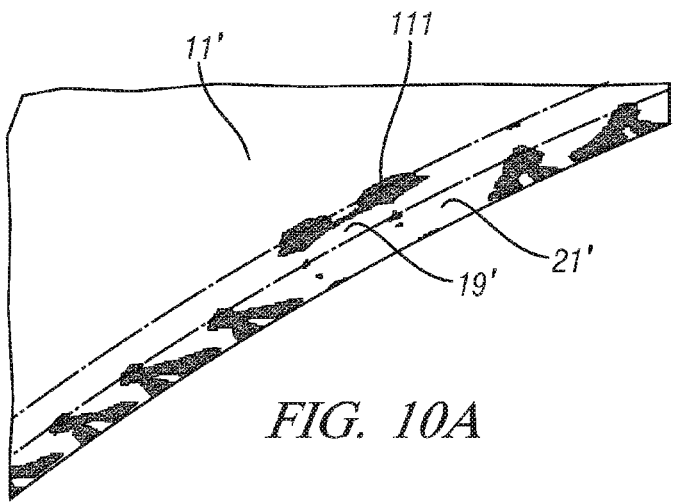
FIGS. 10A and 10B compare the computed stress distributions in roofs of similar interior geometry but different flange and wall section geometry.
Figure 10B:
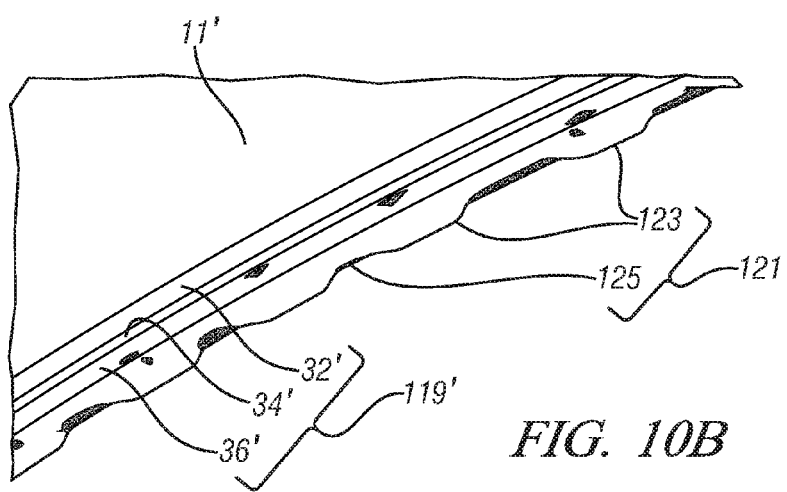

FIGS. 10A and 10B show computed results obtained using a non-linear thermal finite-element stress analysis conducted using the finite-element solver ABAQUS®. The results were obtained by modeling the roof design shown in FIG. 9 when appropriately attached to a steel vehicle body under exposure to 180° C., representative of a paint bake oven. FIG. 10A shows, in stipple, regions of high computed stresses developed in a portion of the roof panel shown in FIG. 5 with a wall section 19' and roof flange 21' and roof section 11'. These stress regions represent regions where the magnitude of the stress is sufficient to induce plastic buckling. FIG. 10B similarly shows regions of high computed stresses developed in a portion of a roof panel like that shown in FIG. 9 with a wall section 119' and roof flange 121 and identical roof section 11' to that shown in FIG. 10A. In contrast to the design shown in FIG. 10A where appreciable stresses develop in several locations on the roof flange and are transmitted, at 111 into roof section 11', the design shown in FIG. 10B dramatically reduces the number and extent of high stress regions and prohibits the development of high stress regions in the roof 11' where any deformation would be visible. Even if the high stress regions of FIG. 10B induce plastic buckling it will occur in regions which will generally be hidden from view by, for example, sealing strip 29 (FIG. 3). This beneficial outcome reflects the cooperative effects of both roof design modifications, the tabbed flange and the stepped wall.

Although the benefits and utility of the invention have been demonstrated for a combination of these roof modifications, it will be appreciated that these modifications may be employed individually. It may be anticipated that individual application of these modifications will be less effective in reducing the stresses, but such an approach may be preferred if other roof design and/or roof attachment practices can be employed to reduce the stresses or if modification to the wall section geometry might interfere with the application or retention of sealing strip 29.

While some practices of the invention have been illustrated, these embodiments are intended to illustrate the invention but not to limit its scope.

The invention claimed is:

1. An automotive vehicle body which is to be painted and heated in a paint bake oven during the manufacture of the vehicle; the vehicle body comprising:
    a pair of body members for defining the sides of a passenger compartment for the vehicle and for supporting a roof over the passenger compartment, the body members being formed of a steel alloy and each having upper, generally horizontal flanges for attachment to a roof; and
    a unitary sheet metal roof formed of an aluminum-based alloy and having a generally rectangular shape, in plan view, with sides for attachment to the flanges of the body members, the roof further comprising a domed center to overlie the passenger compartment and downwardly-sloping sides terminating in generally horizontal tabbed flanges, outwardly extending, for attachment with rivets to the flanges of the body members with the roof flanges overlying the body member flanges;
    each downwardly-sloping side being interrupted with at least one generally horizontal step, outwardly extending, to divide each sloping side into at least two segments, a first downwardly-sloping segment, with a first length, above each step, and a second, downwardly-sloping, with a second length, below each step; each sloping side terminating in its flange, the flange having a width, and each horizontal flange comprising spaced-apart tabs, extending from the outer edge of the flange; each tab being sized and positioned to accommodate a rivet for attachment to the underlying body flange; the configuration of the downwardly-sloping segments and the flange tabs cooperating to reduce thermal distortion of the attached roof when the body is being heated.

2. The automotive vehicle body of claim 1, in which the segments of the downwardly-sloping sides of the unitary sheet metal roof are all of approximately equal length.

3. The automotive vehicle body of claim 1, in which the segments of the downwardly-sloping sides of the unitary, aluminum alloy sheet metal roof are all outwardly-inclined.

4. The automotive vehicle body of claim 1, in which the segments of the downwardly-sloping sides of the unitary, aluminum alloy, sheet metal roof are all inwardly-inclined.

5. The automotive vehicle body of claim 1, in which at least one of the segments of the downwardly-sloping sides of the unitary, aluminum alloy, sheet metal roof is inwardly-inclined and at least one of the segments of the downwardly-sloping sides of the unitary, aluminum alloy, sheet metal roof is outwardly-inclined.

6. The automotive vehicle body of claim 1, in which the tabs on the flanges of the unitary, aluminum alloy, sheet metal roof are equally spaced.

7. The automotive vehicle body of claim 1, in which the tabs of the unitary, aluminum alloy, sheet metal roof extend from their respective flanges by a distance ranging from 25% to 100% of the width of the flange.

8. The automotive vehicle body of claim 1, in which the tabs of the unitary, aluminum alloy, extend from their respective flanges by a distance equal to about 66% of the width of the flange.

9. A unitary sheet metal roof formed of an aluminum alloy and adapted for attachment to an automotive vehicle body, the body comprising a pair of steel body members for defining the sides of a passenger compartment for the vehicle, and for supporting the roof over the passenger compartment; each body member having an upper, generally horizontal flange for attachment to a roof, the roof comprising;
    a domed center to overlie the passenger compartment with downwardly-sloping sides terminating in generally horizontal tabbed flanges, outwardly-extending, for attachment with rivets to the flanges of the body members with the roof flanges overlying the body member flanges;
    each downwardly-sloping side being interrupted with at least one generally horizontal step, outwardly extending, to divide each sloping side into at least two segments, a first downwardly-sloping segment, with a first length, above each step, and a second downwardly-sloping segment, with a second length, below each step; each sloping side terminating in its flange, the flange having a width; and each horizontal flange comprising spaced-apart tabs extending from the outer edge of the flange; each tab being sized and positioned to accommodate a rivet for attachment to the underlying body flange; the configuration of the downwardly-sloping segments and the flange tabs cooperating to reduce thermal distortion of the attached roof.

10. The unitary sheet metal roof of claim 9 in which the segments of the downwardly-sloping sides of the unitary sheet metal roof are all of approximately equal length.

11. The unitary sheet metal roof of claim 9, in which the segments of the downwardly-sloping sides of the roof are all outwardly-inclined.

12. The unitary sheet metal roof of claim 9, in which the segments of the downwardly-sloping sides of the roof are all inwardly-inclined.

13. The unitary sheet metal roof of claim 9, in which at least one the segments of the downwardly sloping sides of the roof is inwardly-inclined and at least one of the segments of the downwardly sloping sides of the roof is outwardly-inclined.

14. The unitary sheet metal roof of claim 9, in which the tabs on the flanges of the roof are equally spaced.

15. The unitary sheet metal roof of claim 9, in which the tabs extend from their respective flange by a distance ranging from 25% to 100% of the width of the flange.

16. The unitary sheet metal roof of claim 9, in which the tabs extend from their respective flange by a distance equal to about 66% of the width of the flange.

17. An automotive vehicle body which is to be painted and heated in a paint bake oven during the manufacture of the vehicle; the vehicle body comprising:
    a pair of body members for defining the sides of a passenger compartment for the vehicle and for supporting a roof over the passenger compartment, the body members being formed of a steel alloy and each having upper, generally horizontal flanges for attachment to a roof; and a unitary sheet metal roof formed of an aluminum-based alloy and having a generally rectangular shape, in plan view, with sides for attachment to the flanges of the body members, the roof further comprising a domed center to overlie the passenger compartment and downwardly-sloping sides terminating in generally horizontal tabbed flanges, outwardly extending, for attachment with rivets to the flanges of the body members with the roof flanges overlying the body member flanges, each sloping side being interrupted with a generally horizontal step, outwardly extending, to divide each sloping side into two segments of substantially equal length, a first downwardly-extending segment above the step and a second, downwardly-extending segment below the step; the sloping side terminating in its flange, the flange having a width; and each horizontal flange comprising unequally-spaced, spaced-apart tabs, extending from the outer edge of the flange; each tab being sized and positioned to accommodate a rivet for attachment to the underlying body flange; the configuration of the downwardly-extending segments and the flange tabs cooperating to reduce thermal distortion of the attached roof when the body is being heated.

18. The automotive vehicle body of claim 17, in which the segments of the downwardly-sloping sides of the unitary, aluminum alloy sheet metal roof are all outwardly-inclined.

19. The automotive vehicle body of claim 17, in which the segments of the downwardly-sloping sides of the unitary, aluminum alloy, sheet metal roof are all inwardly-inclined.

20. The automotive vehicle body of claim 17, in which at least one of the segments of the downwardly-sloping sides of the unitary, aluminum alloy, sheet metal roof is inwardly-inclined and at least one of the segments of the downwardly-sloping sides of the unitary, aluminum alloy, sheet metal roof is outwardly-inclined.

* * * * *